United States Patent [19]
Suzuki

[11] Patent Number: 5,987,185
[45] Date of Patent: Nov. 16, 1999

[54] MULTIPLE VALVE IMAGE FILTERING DEVICE

[75] Inventor: Masato Suzuki, Saitama, Japan

[73] Assignee: Fuji Xerox Co., Ltd., Tokyo, Japan

[21] Appl. No.: 08/100,201

[22] Filed: Aug. 2, 1993

Related U.S. Application Data

[63] Continuation of application No. 07/592,657, Oct. 4, 1990, abandoned.

[30] Foreign Application Priority Data

Dec. 15, 1989 [JP] Japan ..................................... 1-323879

[51] Int. Cl.$^6$ ....................................................... H04N 1/40
[52] U.S. Cl. ........................... 382/263; 358/447; 358/448; 358/463; 358/466; 382/264
[58] Field of Search ..................................... 358/448, 447, 358/455, 456, 458, 461, 463, 465, 466; 382/263, 264; H04N 1/40

[56] References Cited

U.S. PATENT DOCUMENTS

| | | |
|---|---|---|
| 4,072,818 | 2/1978 | Coviello ................................. 358/463 |
| 4,499,493 | 2/1985 | Nishimura ............................... 358/463 |
| 4,647,972 | 3/1987 | Strehl ...................................... 358/447 |
| 4,649,422 | 3/1987 | Rauskolb et al. ....................... 358/447 |
| 4,694,342 | 9/1987 | Klees ....................................... 358/463 |
| 4,724,488 | 2/1988 | Van Daele et al. ..................... 358/463 |
| 4,817,174 | 3/1989 | Nakatani ................................. 358/448 |
| 4,868,671 | 9/1989 | Murakami ............................... 358/400 |
| 4,899,225 | 2/1990 | Sasuga et al. ........................... 358/448 |
| 4,953,114 | 8/1990 | Sato ......................................... 358/456 |
| 4,996,603 | 2/1991 | Kanemitso et al. ..................... 358/466 |
| 4,999,718 | 3/1991 | Arai ......................................... 358/456 |

*Primary Examiner*—Kim Yen Vu
*Attorney, Agent, or Firm*—Finnegan, Henderson, Farabow, Garrett & Dunner, L.L.P.

[57] ABSTRACT

A multible value image filtering device selectively filters segments making up an image signal. The selection is made according to the segments' characteristics, such as the optical density or amount of change of optical density between adjacent segments. The characteristics are compared to a threshold which can be changed according to various conditions, such as the type of document being scanned.

2 Claims, 14 Drawing Sheets

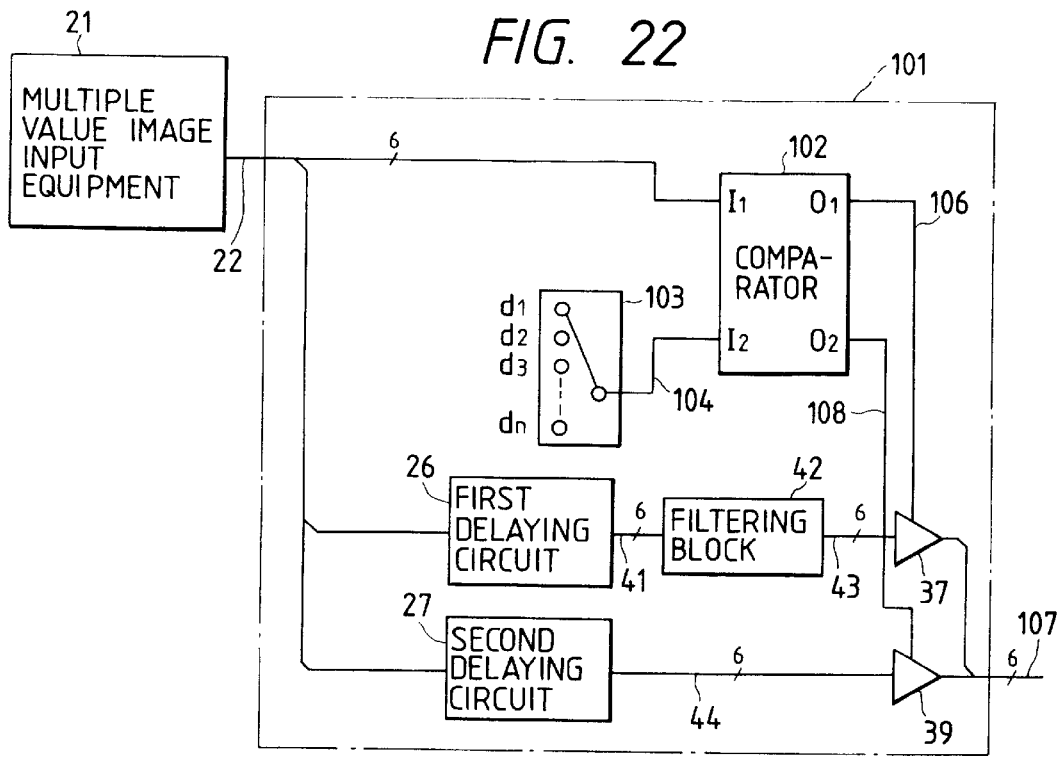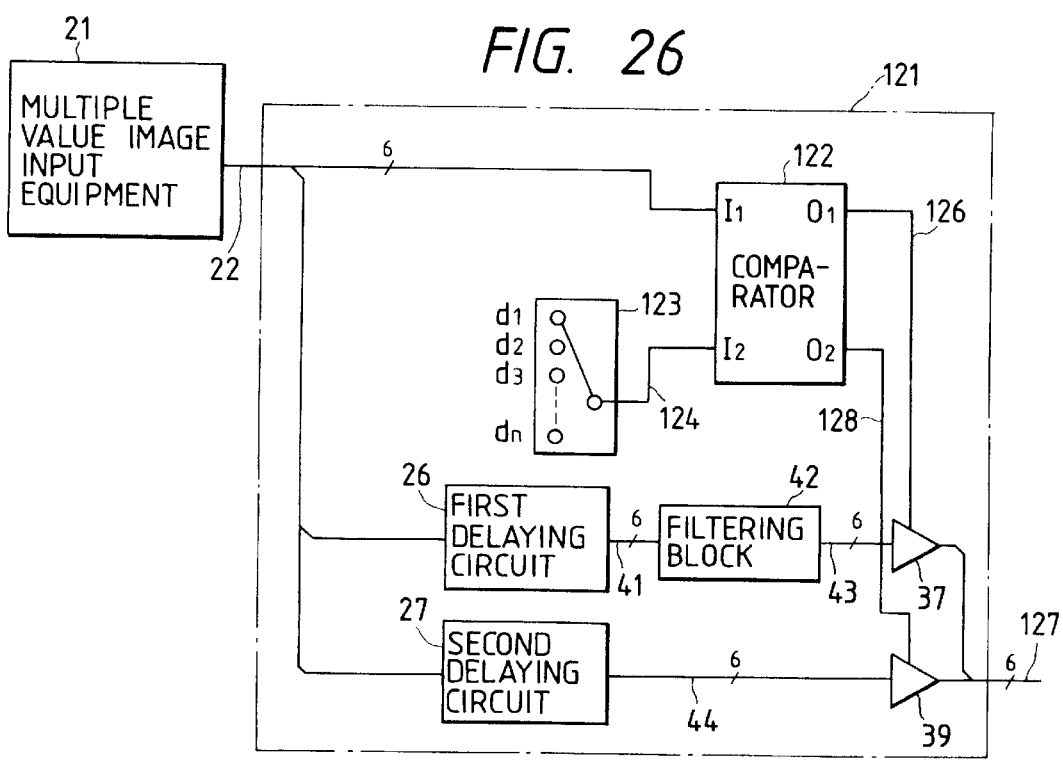

MULTIPLE VALVE IMAGE FILTERING DEVICE

This application is a continuation of application Ser. No. 07/592,657 filed Oct. 4, 1990, now abandoned.

BACKGROUND OF THE INVENTION

1. Field of the Invention

The present invention relates to multiple value image filtering devices which can be used in an image scanner capable of reading multiple optical density values of picture images and, more specifically, to such multiple value image filtering devices designed to eliminate noise from multiple-valued picture image data.

2. Discussion of the Related Art

Conventional picture image reading devices read picture image information on original documents and represent that information as picture image data capable of assuming multiple values. Such image reading devices are used for reproducing the lighting and shading of photographs and other images. Conventional picture reading devices, however, often produce picture image data having black or white dots in parts of the reproduced picture images. According to one description, the dots resemble "parched sesame seeds mixed with salt." An example of these dots is shown in area 11 in FIG. 1.

These dots, which are called "noise," occur because of the complicated interaction of various factors such as fluctuations in the output of the individual pixels themselves in the image sensor, a local lack of uniformity in the exposure of the picture images to light in an exposure unit, or a non-constant moving speed of the scanning unit in relation to the original sheet.

This noise causes considerable deterioration of the quality of reproduced picture images similar to the deterioration in a television system in which noise appears as snow grains on the television screen.

FIG. 2 illustrates the construction of a conventional multiple value image filtering device for removing such noise. This device is provided with a linear low pass filter 13 and is designed to receive multiple value picture image data 14 at its input. Linear low pass filter 13 sequentially receives segments of multiple value picture image data for individual pixels and inhibits the passage of those segments of the picture image data having a sharp change in density. A sharp change, which is manifested by segments in a high frequency range, indicates noise. Multiple value picture image data 15 without noise can be obtained from the output of linear low pass filter 13.

If the cut-off frequency of low pass filter 13 is set too high, filter 13 permits image data containing noise components to pass through as normal picture image data without modification. If this occurs, the noise has not been completely removed from the conventional multiple value image filtering device.

The lower the cut-off frequency level is set, the more thoroughly the filtering device eliminates noise. Hence, for eliminating noise only, the cut-off frequency should be as low as possible. The lower the cut-off frequency, however, the more probable it will be that components of proper picture images are also eliminated. If proper image data components are eliminated, the reproduced picture images are dull and lack adequate definition, especially in areas in which a white background makes a transition into black characters or vice versa.

The effect of too much filtering can be seen by reference to FIG. 3(*a*) and FIG. 3(*b*). FIG. 3(*a*) illustrates the state of multiple value picture image data output in 64 chromatic grades from a scanner sensing one line of a picture image. On the vertical axis, the value "0" represents the state with the highest degree of black color while "63" represents the state with the highest degree of white color. The horizontal axis represents calibrated positions on the main scanning direction, the main scanning width being divided into 100 equal parts. The relationship between the vertical and horizontal axes is same in FIG. 3(*b*).

When the multiple value picture image data shown in FIG. 3(*a*) are filtered through the linear low pass filter 13 in FIG. 2, the resulting picture images will be as shown in FIG. 3(*b*). As the result of eliminating the high frequency components, the picture images show a density waveform that is flattened without picture image information where considerable changes in density occur. This effect is present regardless of whether the eliminated picture image information represents noise. The result is that the density in that area is reduced and approaches the density in the adjacent parts so that the difference in density is rendered less conspicuous. Consequently, the contour of the picture images loses sharpness and the shades of the picture images become indistinct.

SUMMARY OF THE INVENTION

The present invention has been made in view of these circumstances and has as an object a multiple value image filtering device which is capable of eliminating the noise in a highly efficient manner while maintaining sharp picture images.

Another object of the present invention is a multiple value image filtering device which change its noise-eliminating characteristics in a manner suitable for the conditions of the original sheet.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a multiple value image filtering apparatus for filtering noise from an image signal composed of sequential data segments, comprises characteristic extracting means for extracting from the data segments of the image signal a characteristic used to determine the data segments to be filtered, comparing means, coupled to the characteristic extracting means, for comparing a prescribed threshold value with the characteristic extracted from the image signal data segments to generate a filter signal when the characteristic has a predetermined relationship with the threshold value, and to generate a nonfilter signal when the characteristic does not have the predetermined relationship with the threshold value; filter means for filtering selected data segments of the image signal to form filtered data segments; and output signal forming means, responsive to the filter signal and the nonfilter signal and receiving as inputs the sequential data segments of the image signal and the filtered segments from the filter means, for generating a multiple value image filtering apparatus output signal as a sequence of output data segments corresponding to the image signal data segments, the output data segments being the corresponding image signal data segments when the nonfilter signal is received and being the filtered data segments when the filter signal is received.

BRIEF DESCRIPTION OF THE DRAWINGS

The accompanying drawings, which are incorporated in and constitute a part of this specification, illustrate embodiments of this invention and, together with the description, serve to explain the objects, advantages and principles of the invention. In the drawings:

FIG. 22 is a block diagram of a fourth embodiment of the multiple value image filtering device of this invention;

FIG. 26 is a block diagram of a fifth preferred embodiment of the multiple value image filtering device of the invention;

DESCRIPTION OF THE PREFERRED EMBODIMENTS

Figure 1:
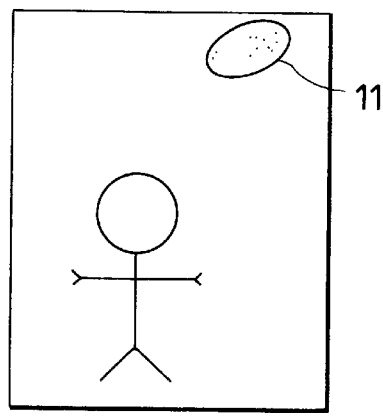
FIG. 1 is a view of a picture image on display illustrating noise.

Reference will now be made in detail to the preferred embodiments of this invention in which like reference characters designate like or corresponding parts throughout the several drawings.

In the following description, some preferred embodiments of the present invention will be used as examples. It should be understood, however, that the present invention is not limited to these examples of its embodiments, but may be applied effectively to other embodiments to such an extent as will not deviate from the technical scope defined for the present invention.

First Preferred Embodiment

Figure 4:
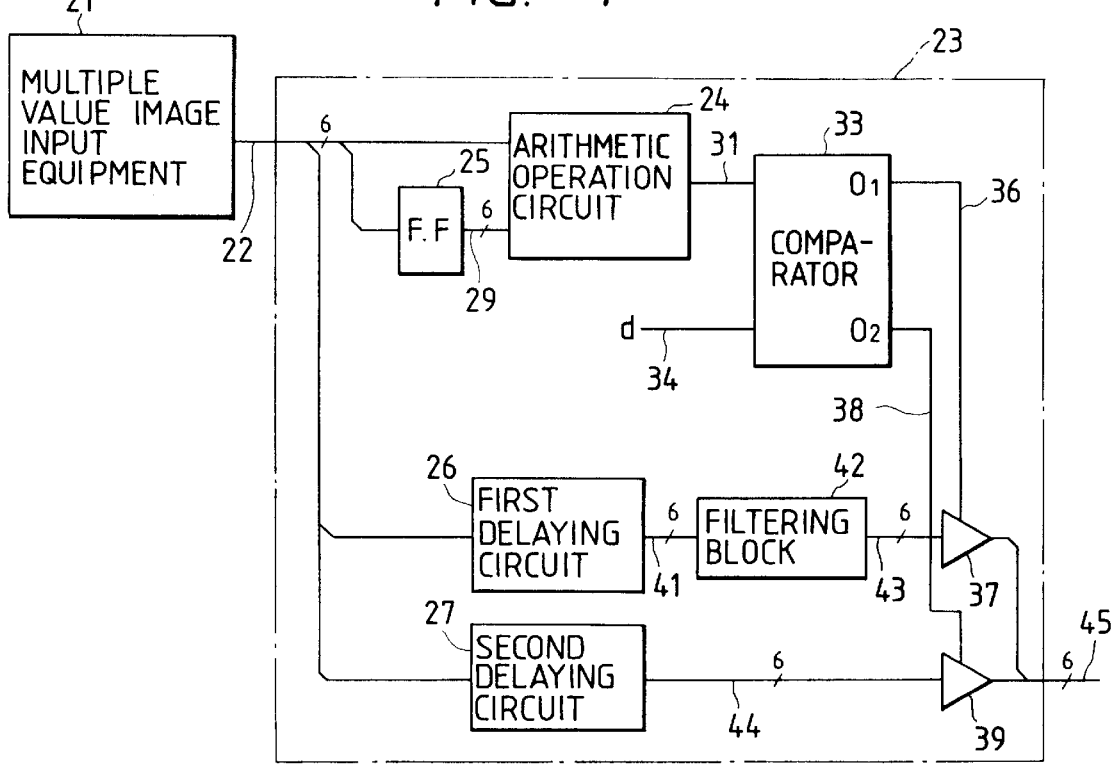
FIG. 4 is a block diagram illustrating a first preferred embodiment of a multiple value image filtering device connected to the multiple value image input equipment.

FIG. 4 is a diagram of a first preferred embodiment of the multiple value image filtering device 23 of the present invention as connected to a multiple value image input equipment.

Multiple value image input equipment 21 is equipped with a mean image sensor to read the picture image data on each line through a scanning operation. The linear image sensor outputs the multiple value picture image data 22 in 64 chromatic grades as serial data synchronized with a clock signal (not shown). The multiple value picture image data 22 are input to the multiple value image filtering device 23 to eliminate noise.

Multiple value image filtering device 23 receives multiple value picture image data 22 in 64 chromatic grades and sends that data, in parallel, to an input terminal of an arithmetic operation circuit 24, a flip-flop circuit 25 which stores the multiple value picture image data in synchronism with a clock signal, and to a first delaying circuit 26 and a second delaying circuit 27. Delaying circuits 26 and 27 delay the multiple value picture image data by a first delay time and a second delay time, respectively.

Flip-flop circuit 25, which serves as a one-clock-cycle delay for the multiple value picture image data 29, preferably includes six circuits. Each circuit corresponds to one bit of the six-bit multiple value picture image data 22 for expressing the 64 chromatic grades.

Multiple value picture image data 22 are input six bits at a time into the arithmetic operation circuit 24 in the same way as delayed multiple picture image data 29. Circuit 24 determines the absolute value of the difference between these two multiple value picture image data. Arithmetic operation result 31 thus represents the difference in density between two adjacent pixels which have been input with one clock delay.

Arithmetic operation result 31 is fed to the input terminal $I_1$ of the comparator 33. Terminal $I_2$ receives a threshold signal 34 representing a threshold value d, also known as a determining criterion value, from a reference voltage source (not shown). When the arithmetic operation result 31 is either equal to or smaller than the level of threshold signal 34, comparator 33 outputs a first gate close signal 36 from the first output terminal $O_1$. The first gate close signal 36 is fed to the gate control terminal of a first gate 37. Comparator 33 outputs the second gate close signal 38 from its second output terminal $O_2$ when arithmetic operation result 31 is greater than the signal level of the threshold signal 34. The second gate close signal 38 is fed to the gate control terminal of a second gate 39. The first gate 37 and the second gate 39 are preferably three-state buffers.

The multiple value picture image data 22 are fed also to a first delaying circuit 26 and a second delaying circuit 27. First delaying circuit 26 delays the multiple value picture image data 22 to synchronize the multiple value picture image data 22 with the first gate close signal 36 at first gate 37. Delay circuit 26 feeds delayed output 41 to a filtering block 42 which performs filtering operations on the input digital data by means of a prescribed linear low pass filter. Filtering block 42 outputs the result of this filtering process to first gate 37.

Simultaneously, second delaying circuit 27 delays multiple value picture image data 22 to synchronize the picture image data with gate close signal 38 at second gate 39. Delaying circuit 27 feeds delayed output 44 to second gate 39.

First gate 37 and second gate 39 are designed to output data on a mutually exclusive basis. The data thus output from gates 37 and 39 are combined and output as the filtered multiple value picture image data 45 from the multiple value image filtering device 23.

Figure 3A:
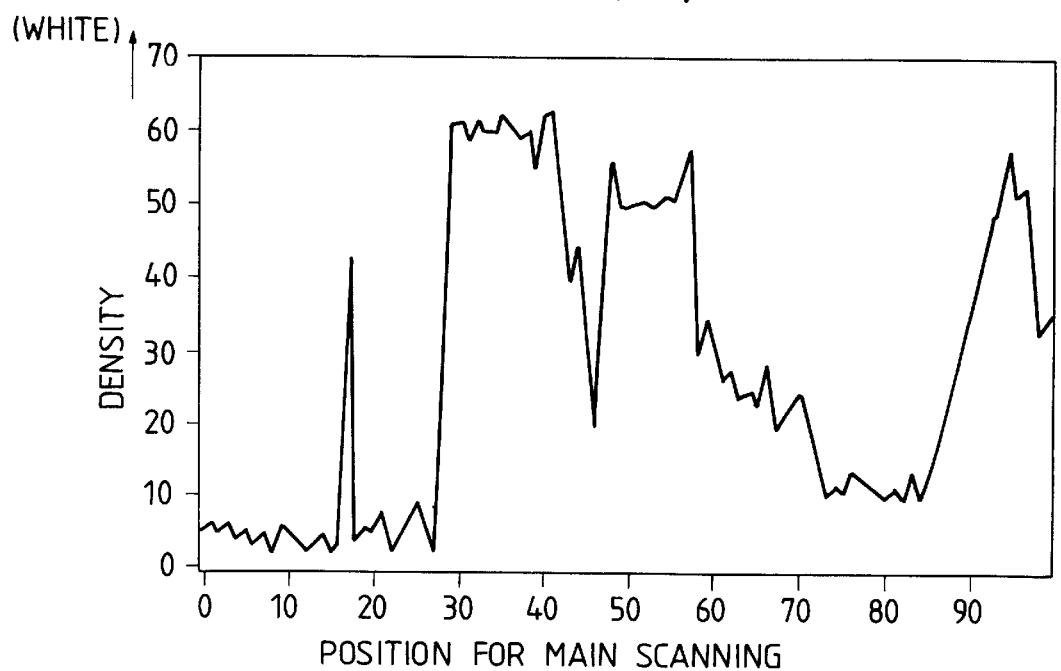
FIG. 3(a) is a chart illustrating multiple value picture image data output in 64 chromatic grades from a scanner during the scan of one line.

After multiple value image input equipment 21 completes a scanning operation on an original sheet (not shown), it outputs the multiple value picture image data as shown in FIG. 3(a) in synchronism with a clock signal (not shown). When multiple value picture image data for the n-th position on one line (n is an integer representing one of pixels used to read a line of the original sheet) are fed to the multiple value image filtering device 23, flip-flop circuit 25 holds these data for a prescribed delay period of preferably one clock cycle, and outputs the delayed data as delayed multiple value picture image data 29 to arithmetic operation circuit 24 in synchronism with the next clock signal. Arithmetic operation circuit 24 thus receives the multiple value picture image data for the n-th position and the (n+1)-th position, and outputs the absolute value of their difference as arithmetic operation result 31.

Comparator 33 compares arithmetic operation result 31 with the signal level of the threshold value signal 34, which is expressed as "d". For reasons that will be clearer below, this value is also called a determining criterion value.

Figure 5:
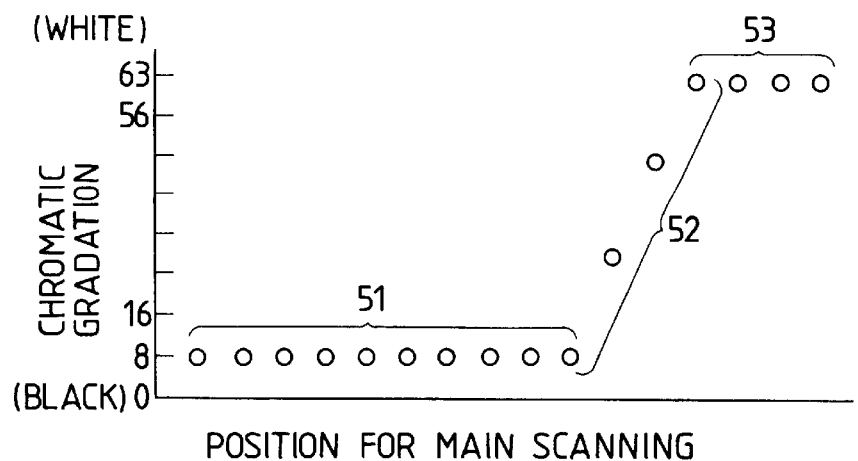
FIG. 5 is a graph of certain characteristics for multiple value picture image data in an ideal state.
Figure 6:
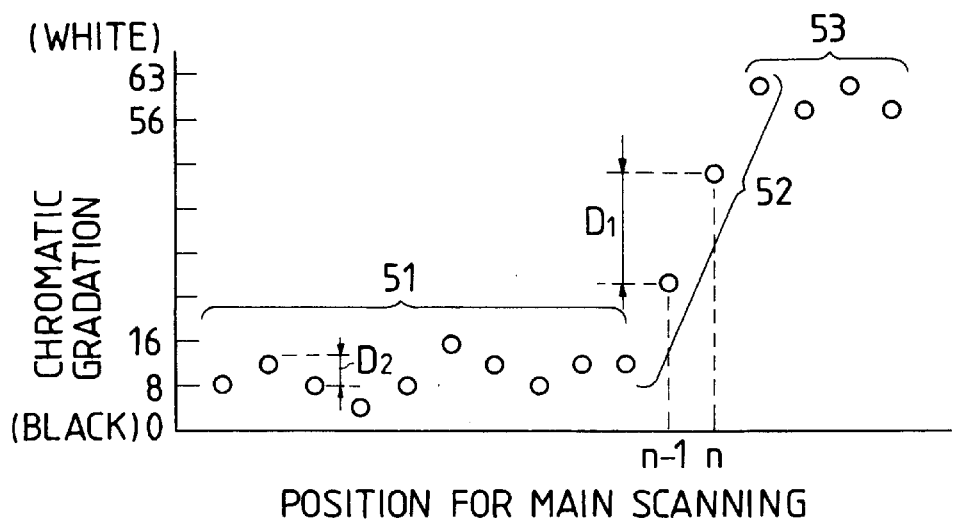
FIG. 6 is a graph of the data characteristics in a deteriorated state for the example of FIG. 5.
Figure 7:
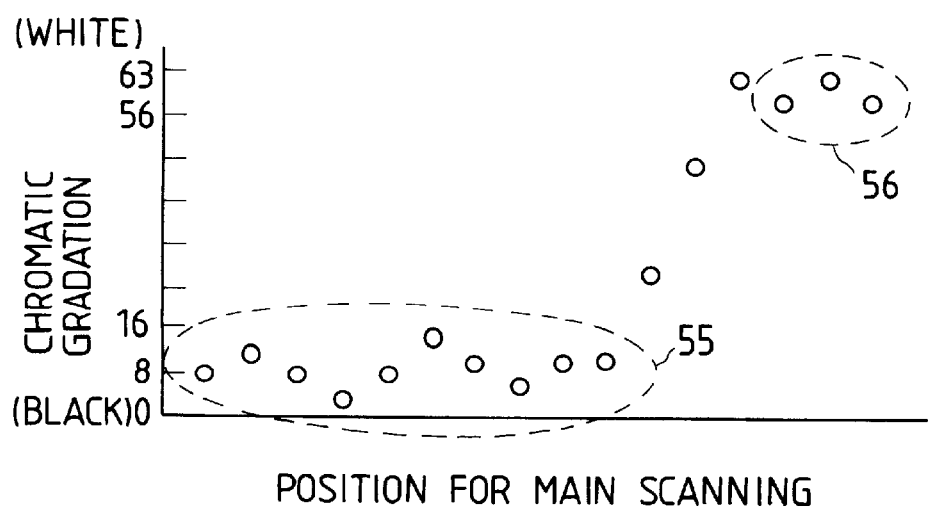
FIG. 7 is a graph of the data in FIG. 6 showing ranges for filtering.

FIG. 5 through FIG. 7 illustrate the relationship between the signal level d and the filtering process. FIG. 5 illustrates some part of the multiple value picture image data in an ideal reading condition as input into the multiple value image filtering device 23.

The density of the picture image from which the image data is extracted is relatively dark at area 51, which is at the left side of the main scanning direction. The area 52 in the middle shows a sharp change in density, and the area 53 on the right side is relatively white. The left side area 51 and the right side area 53 show a constant level of density, and noise is not generated in these areas.

In contrast, FIG. 6 illustrates the same picture images in a deteriorated condition due to noise received at the multiple value image filtering device 23. In FIG. 6, both the left side area 51' and the right side area 53' show considerable fluctuations in density levels, and it is possible that these local fluctuations in density appear as noise taking the form of "parched sesame seeds mixed with salt" when output.

In this regard, the changes in density between adjacent pixels in FIG. 5 and FIG. 6 is much larger in area 52', where density changes sharply in such areas as the boundary regions of characters and ruled lines, than in area 51' or at the right side area 53'. Filtering can therefore be performed on the picture images without impairing the sharpness of the images' definition by choosing as a determining criterion for filtering, i.e., threshold value d, a value smaller than the general density difference D- in area 52, where density undergoes sharp changes, and yet larger than the general density difference DU in the other areas where the density of the picture images remains constant.

FIG. 7 illustrates the range in which the filtering process can be performed with the signal level d for a threshold value selected within such a range. In this example, it can be seen that the two areas 55 and 56, which correspond to the left side area 51' and the right side area 53', respectively, are subjected to the filtering process.

The two kinds of gate close signals 36 and 37, which are output on a mutually exclusive basis from comparator 33 (FIG. 4), determine whether the filtering process is to be applied and, if so, to which areas. Specifically, first gate close signal 37 selects the result of processing 43 by the filtering block 42 for an area in which the density difference between adjacent individual pixels is smaller than the signal level d of the threshold value. This is the case with the area 55 shown in FIG. 7. The processed result thus selected is output as the multiple value picture image data 45 from the multiple value image filtering device 23. In areas other than areas 55 and 56, the delayed output 44 from second delaying circuit 27 which has not been filtered, is selected by the second gate close signal 36 and output as the multiple value picture image data 45 from the multiple value picture image filtering device 23.

Figure 2:
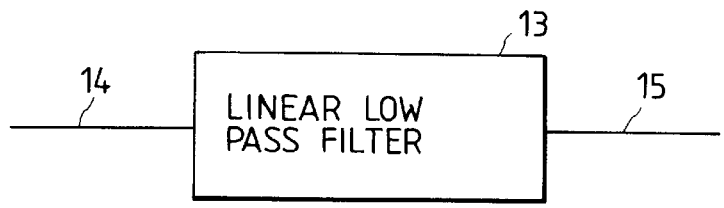
FIG. 2 is a block diagram illustrating the circuit construction of a conventional multiple value image filtering device.
Figure 8:
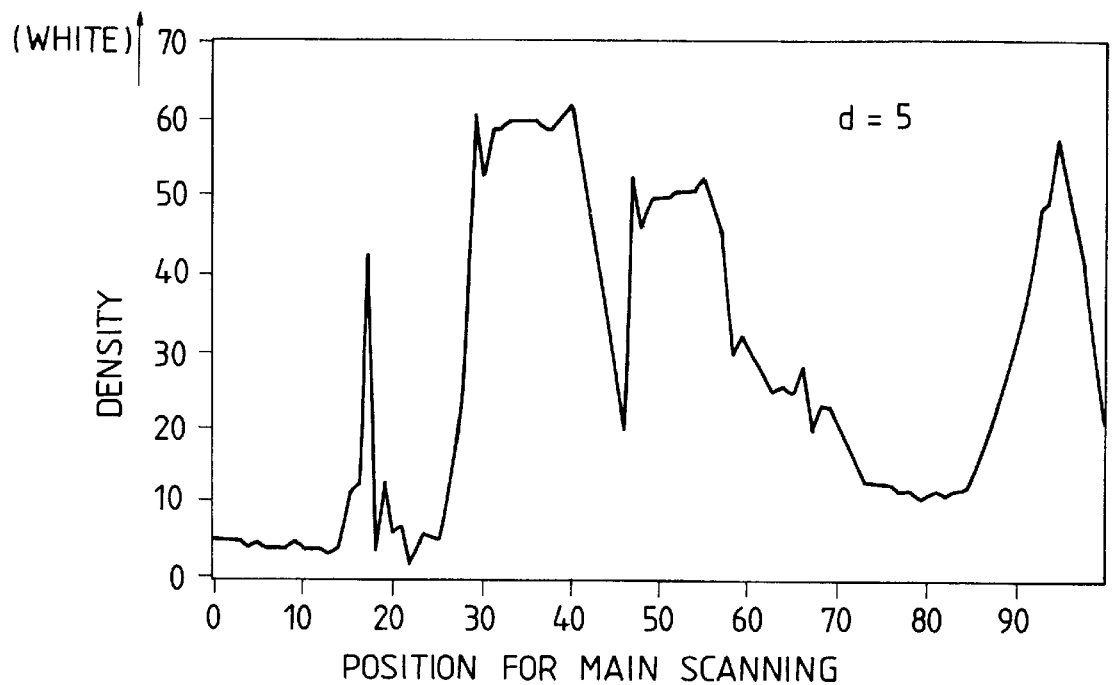
FIG. 8 is a graph showing the characteristics of the multiple value picture image data after filtering for a determining criterion value d equal to 5.
Figure 9:
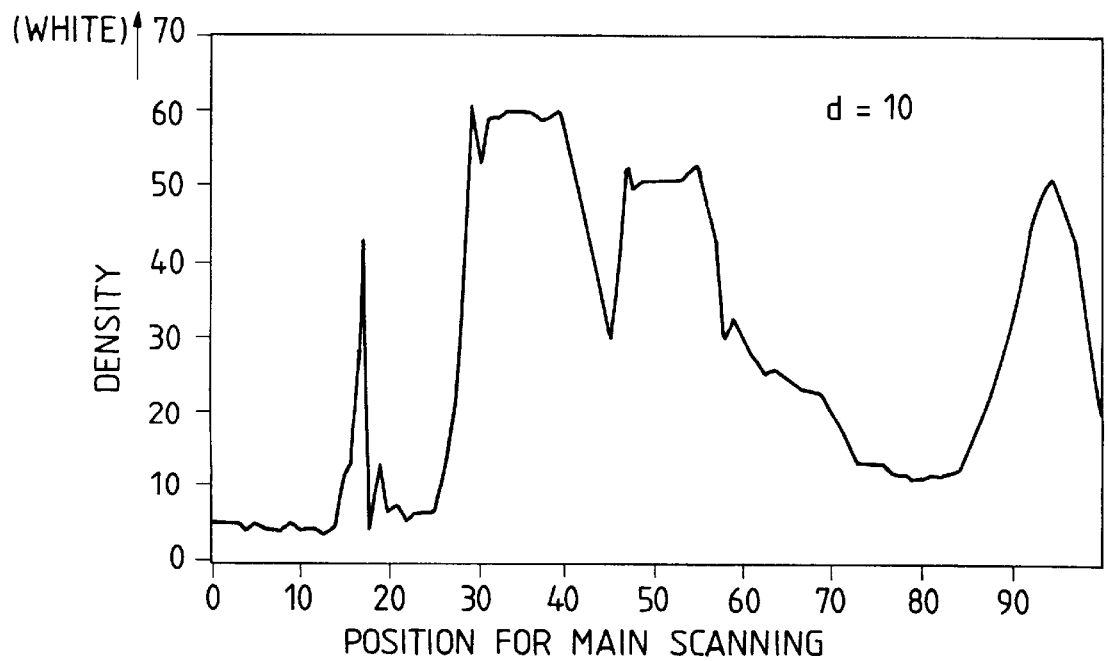
FIG. 9 is a graph showing the characteristics of the multiple value picture image data after filtering for a determining criterion value d equal to 10.
Figure 10:
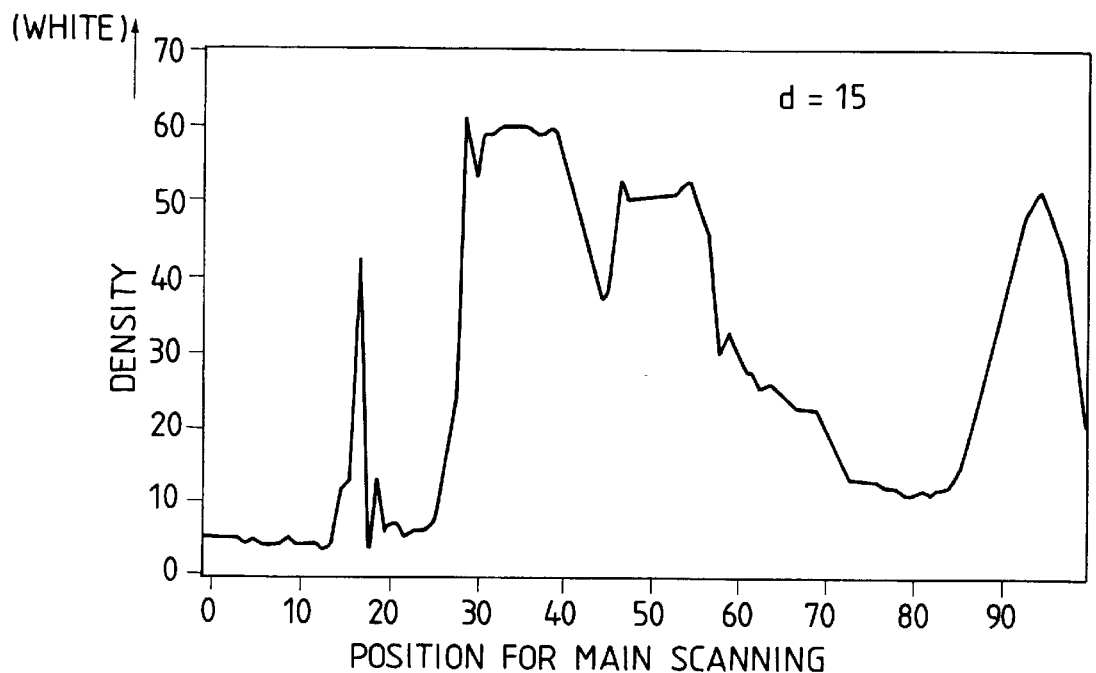
FIG. 10 is a graph showing the characteristics of the multiple value picture image data after filtering for a determining criterion value d equal to 15.
Figure 11:
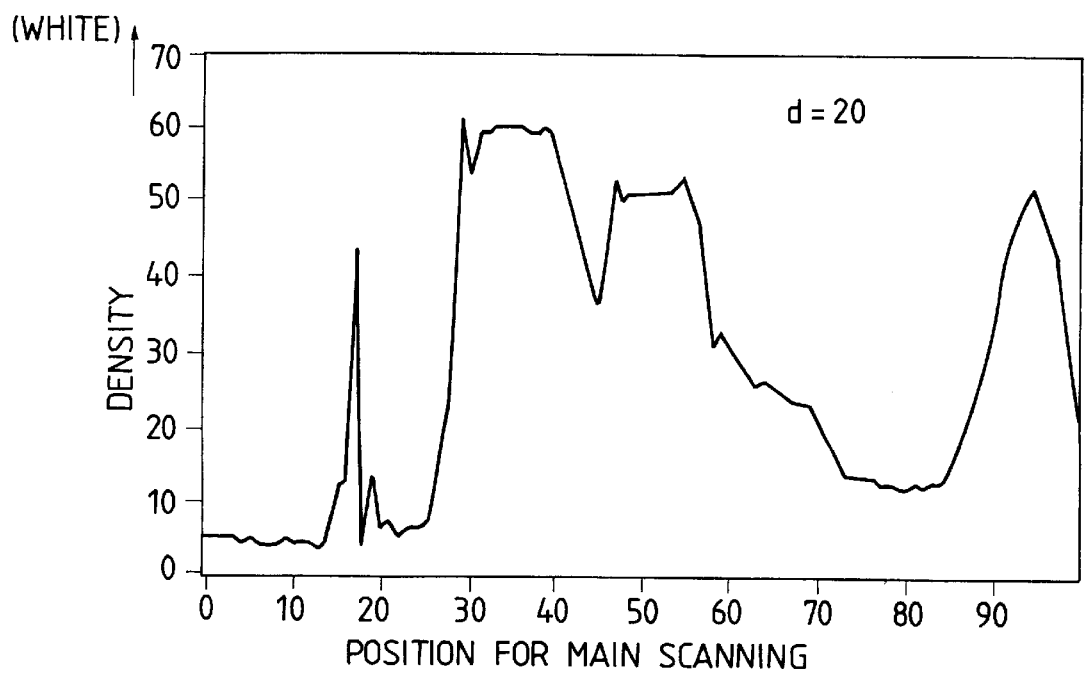
FIG. 11 is a graph showing the characteristics of the multiple value picture image data after filtering for a determining criterion value d equal to 20.

FIG. 8 through FIG. 11 are graphs illustrating the relationship between the signal level d for the threshold value and the filtering characteristics of the first preferred embodiment of the multiple value image filtering device. In FIG. 8, d=5; in FIG. 9, d=10; in FIG. 10, d=15; and in FIG. 11, d=20. The filter used in filtering block 42 is a linear low pass filter identical to the conventional linear low pass filter 13 shown in FIG. 2.

Figure 3B:
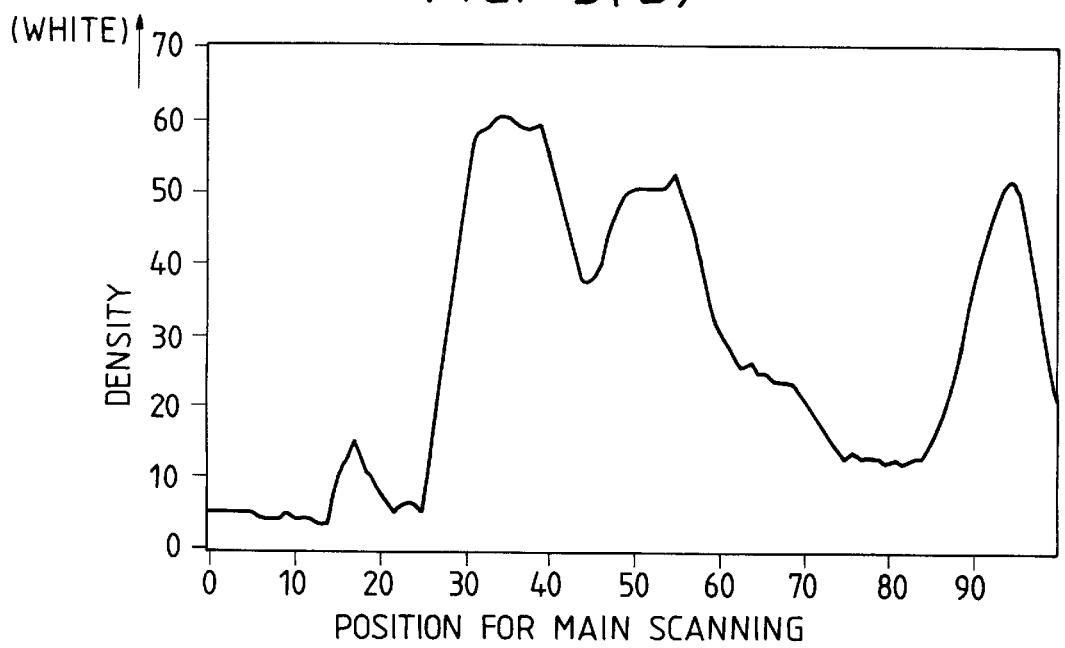
FIG. 3(b) is a chart presenting the characteristics of the multiple value picture image data after the data are subjected to the filtering process with the conventional multiple value image filtering device.

By comparing FIG. 8 with FIG. 3(a), which represents the original sheet, and FIG. 3(b), which shows the results obtained from the conventional filtering process, it can be seen that with the first preferred embodiment of the device of this invention, both the white dots in the proximity of the relative position "16" and the black dots in the proximity of the relative position "46" are reproduced in the same conditions as in the original sheet. Thus, the smaller the signal level d for the threshold value, the smaller the range for the application of the filtering process, and the greater the sharpness in the picture images. It is not possible, however to eliminate the noise generated in the range of fluctuations above signal level d.

When the signal level d for the threshold value is a noise can be effectively eliminated, but the sharpness of the picture images will decline. For example, the black dots in the proximity of relative position "46" shown in FIG. 11 have relatively gradual density changes between adjacent pixels. The filtering process, however, reproduces the black dots as gray. In contrast, the white dots in the proximity of relative position "16" in the main scanning direction are reproduced without change with their sharpness intact, since the signal level for them causes a change in density larger than signal level d=20.

Various types of signal levels for the threshold values have been presented above. It is possible to find the optimum value on the basis of the number of pixels read in the main scanning direction and the characteristics of the reading equipment. In the first preferred embodiment, the signal level d for the threshold value is set at 10, and the multiple value image filtering device has been constructed with this threshold value.

Figure 12:
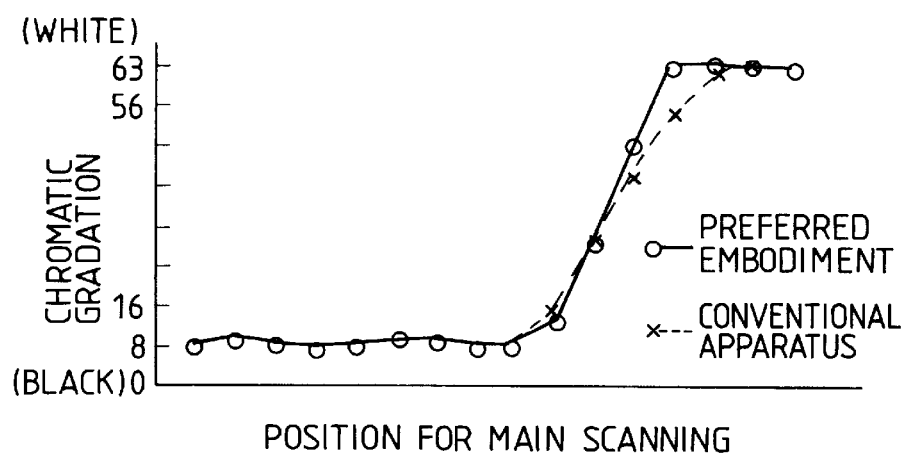
FIG. 12 is a graph comparing the filtering characteristics of the multiple value image filtering device in FIG. 4 and the filtering characteristics achieved with conventional multiple value image data filtering equipment.

FIG. 12 presents a comparison between the characteristics of this multiple value image filtering device 23 in the first preferred embodiment and those of the conventional multiple value image filtering device. In FIG. 12, the vertical axis shows the chromatic gradation on a scale of 64 grades while the horizontal axis represents the positions in the main scanning direction. The result of the filtering by multiple value image filtering device 23 is that areas 55 and 56 shown in FIG. 7 have greater fidelity to the original picture images after filtering than the conventional device.

Figure 13:
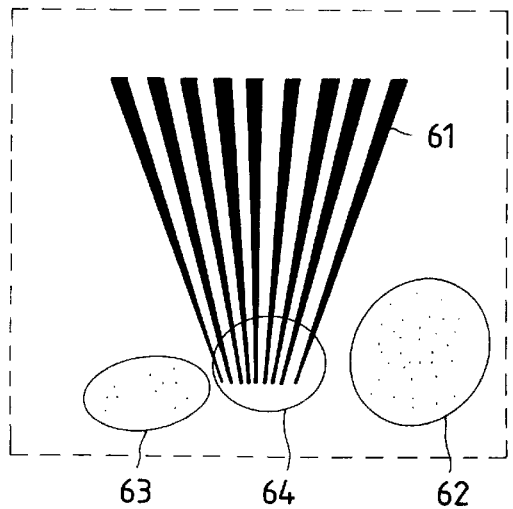
FIG. 13 is a picture, with an enlarged scale, of picture images without filtering.

FIG. 13 illustrates an enlarged view of the multiple value picture image data without filtering. In the peripheral areas of the chart formed of slender radial lines 61, noise 62 and 63 appears as "parched sesame seeds mixed with salt." If the same picture image data are processed with the conventional multiple value image filtering device, the noise 62 and 63 can be eliminated, but the top end part 64 of the chart 61 is rendered indistinct because of a lack of definition due to filtering. The resulting picture images are reproduced entirely in a single color, gray, and the slender lines cannot be distinguished from the background.

Figure 14:
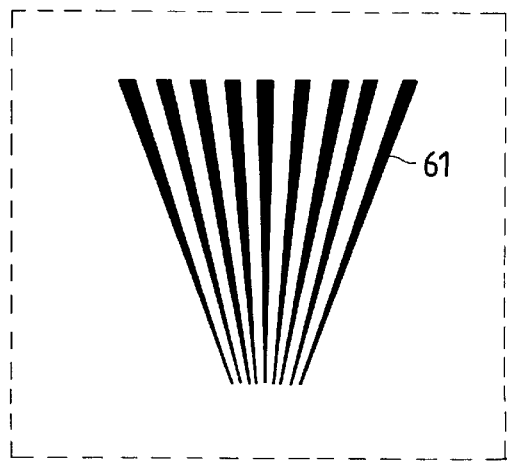
FIG. 14 is the picture of FIG. 13 with filtering having been performed.

As shown in FIG. 14, these slender lines are reproduced as they really are when the picture images are processed with the multiple value image filtering device in the first preferred embodiments. In addition, this filtering device completely eliminates the noise found in FIG. 13.

In the first preferred embodiment, the multiple value picture image data has 64 chromatic grades. The number of chromatic grades is not limited to this number, however. Also, any filters can be used as long as they perform low pass filtering. These points apply as well to the other preferred embodiments described below.

Second Preferred Embodiment

Figure 15:
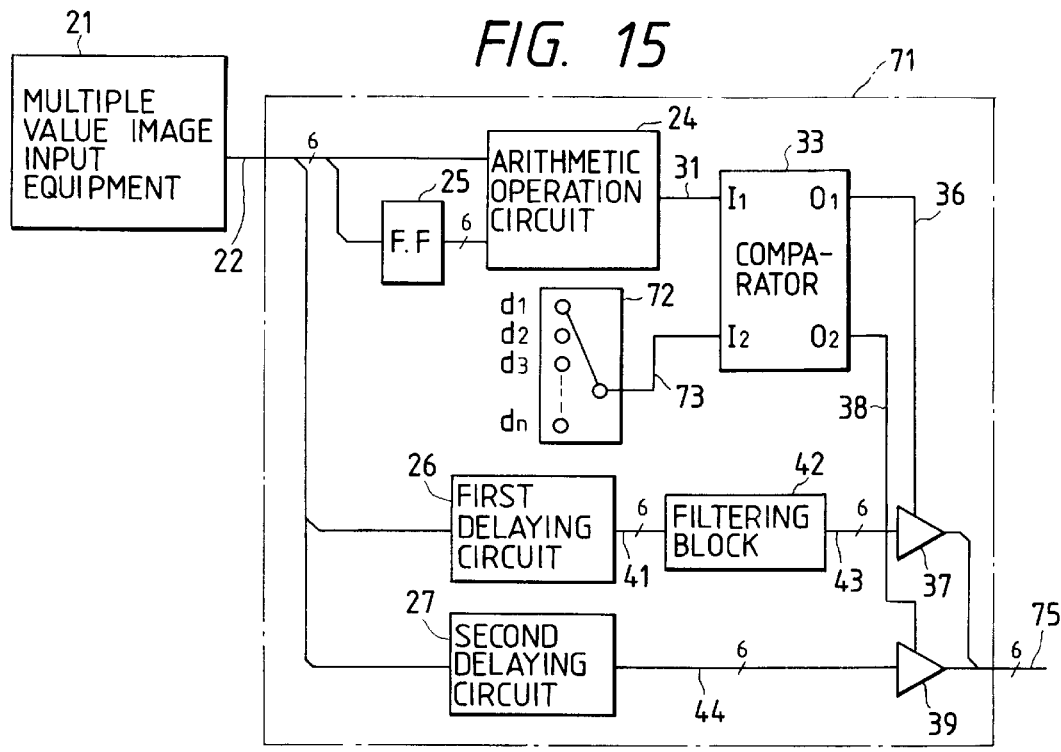
FIG. 15 is a block diagram illustrating a second embodiment of the multiple value image filtering device as connected to the multiple value image input equipment.

FIG. 15 illustrates a second preferred embodiment of the multiple value image filtering device of the present invention as connected to a multiple value image input equipment. The same reference characters are used to indicate the same parts as those shown in FIG. 1, and a description of those parts will be omitted as appropriate.

Comparator 33 in the multiple value image filtering device 71 in this second example of preferred embodiments is provided with two input terminals, $I_1$ at the comparing side, and $I_2$ at the reference voltage side, as is the case with the multiple value image filtering device 23 in the first preferred embodiment. Input terminal $I_1$ receives arithmetic operation result 31 from an arithmetic operation circuit 24. Input terminal $I_2$ at the reference voltage side receives a threshold value signal 73 from a threshold value selecting circuit 72.

Threshold value signal 73, which is also a determining criterion value, indicates boundary at which the filtering process is to be performed. In the second preferred embodiment, one of the signal levels $d_1, d_2, \ldots d_n$ (n is an integer greater than 1) from threshold value selecting circuit 72 is selected for threshold value signal 73. The preferred values signal levels for $d_1, d_2, \ldots dn$ are shown in the Table 1:

TABLE 1

| Signal level | Value |
| --- | --- |
| $d_1$ | 5 |
| $d_2$ | 8 |
| $d_3$ | 10 |
| . | . |
| . | . |
| . | . |
| $d_n$ | 30 |

Comparator 33 compares the signal level d for the input threshold signal 73 with the arithmetic operation result 31. When arithmetic operation result 31 is either equal to or larger than the signal level d, comparator 33 outputs first gate close signal 36 from the first output terminal $O_1$. First gate close signal 36 is fed to the gate control terminal of the first gate 37, and the first gate 37 is closed accordingly. This causes delayed output 44, which is filtered by filtering block 42, to pass through second gate 39 and be output as multiple value picture image data 75 from the multiple value picture image filtering device 71.

In contrast, comparator 33 outputs second gate close signal 38 from second output terminal $O_2$ if arithmetic operation result 31 is less than signal level d. Second gate close signal 38 is fed to the gate control terminal of second gate 39 which causes filtered result 43, as processed by filtering block 42, to pass through first gate 37 and be output as multiple value picture image data 75 from the multiple value picture image filtering device 71.

Figure 16:
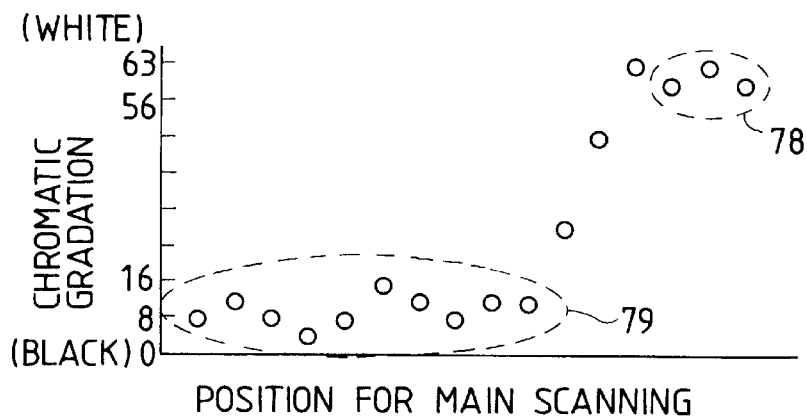
FIG. 16 is a chart illustrating the ranges in which the filtering process is performed for determining criterion value $d_3$.

FIG. 16 is an example the range in which the filtering process is performed for which determining criterion value $d_3$ is selected. As the result of the signal level d being set at 10, the filtering process is selectively applied to the two areas 78 and 79, and the multiple value image filtering device described in this second example has achieved the same picture image processing result as the first preferred embodiments shown in FIG. 7. The device in this example provides an easy way to apply filtering characteristics that are suitable for the particular condition of the processed data by modifying the range for filtering through a change in the determining criterion value d. The change can occur either automatically or manually.

Third Example of Preferred Embodiments

Figure 17:
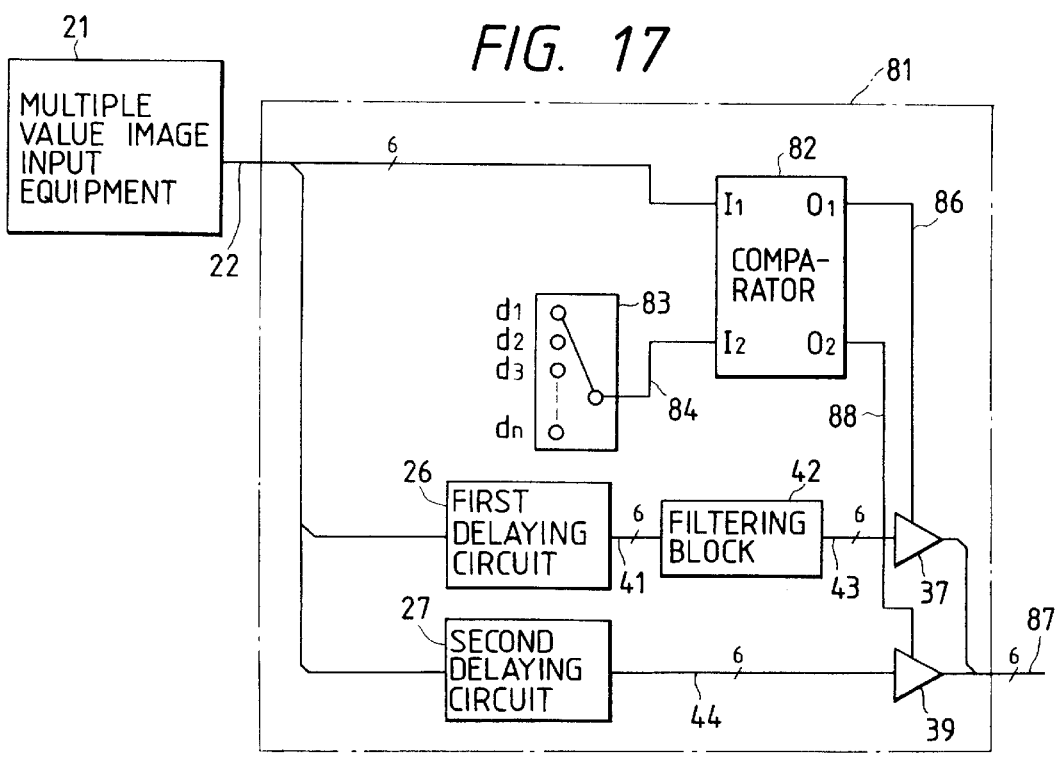
FIG. 17 is a block diagram of a third embodiment of the multiple value image filtering device of the invention.

FIG. 17 illustrates a third preferred embodiment of a multiple value image filtering device according to the present invention as connected to a multiple value image input equipment. Those elements in this FIG. 17 which are the same as those in FIG. 4 and FIG. 15 are indicated with the same reference characters, and a description of those elements is omitted.

A comparator 82 in a multiple value image filtering device 81 is provided with two input terminals, an input terminal $I_1$ at the comparing side, and an input terminal $I_2$ at the reference voltage side, in the same configuration as in the multiple value image filtering device 23 in the first preferred embodiment. Input terminal $I_1$ receive the multiple value picture image data 22 from the multiple value image input equipment 21 in synchronism with a clock signal (not shown). Input terminal $I_2$ at the reference voltage side receives a determining criterion signal 84 from a determining criterion selecting circuit 83. Determining criterion signal 84 is the signal which expresses the determining criterion values for the upper and lower limits for the performance of the filtering process. In the third preferred embodiment, one of the determining criterion values $d_1$, $d_2$ ... $d_n$ in determining criterion selecting circuit 83 is applied to comparator 82. The preferred determining criterion values, $d_1$, $d_2$ ... $d_n$ are as shown in the following Table 2:

TABLE 2

| Signal level | Maximum value $D_{max}$ | Minimum value $D_{min}$ |
|---|---|---|
| $d_1$ | 56 | 10 |
| $d_2$ | 55 | 15 |
| $d_3$ | 50 | 15 |
| . | . | . |
| . | . | . |
| . | . | . |
| $d_n$ | 56 | 38 |

Comparator 82 compares the determining criterion value d for the input threshold signal 84 with the signal level of the multiple value picture image data 22. When that signal level is between the maximum value $D_{max}$ and the minimum value $D_{min}$, comparator 82 outputs a first gate close signal 86 from first output terminal $O_1$. First gate close signal 86 is fed to the gate control terminal of first gate 37 to close gate 37. This causes delayed output 44, unfiltered by filtering block 42, to pass through second gate 39 and be output as the multiple value picture image data 87 from the multiple value image filtering device 81.

Comparator 82 outputs the second gate close signal 88 from second output terminal $O_2$ if the signal level of the multiple value picture image data 22 is outside the range between $D_{min}$ and $D_{max}$. Second gate close signal 88 is fed to the gate control terminal of second gate 39 to cause filtered result 43, processed by the filtering block 42, to pass through first gate 37 and be output as the multiple value picture image data 87 from the multiple value image filtering device 81.

Figure 18:
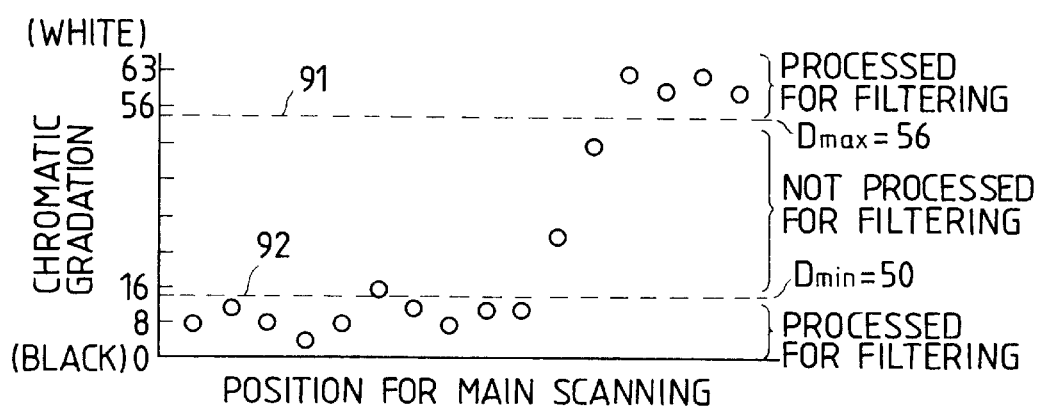
FIG. 18 is a chart illustrating the range in which the filtering process is performed for determining criterion value $d_2$.

FIG. 18 indicates ranges in which the filtering process is performed if determining criterion value $d_2$ is selected. As the result of setting $D_{max}$ at 55 and $D_{min}$ at 15, as shown by the broken lines 91 and 92, filtering is not performed within this range. Filtering is performed by the filtering block 42 only with respect to the individual chromatic grades outside that range.

Figure 19:
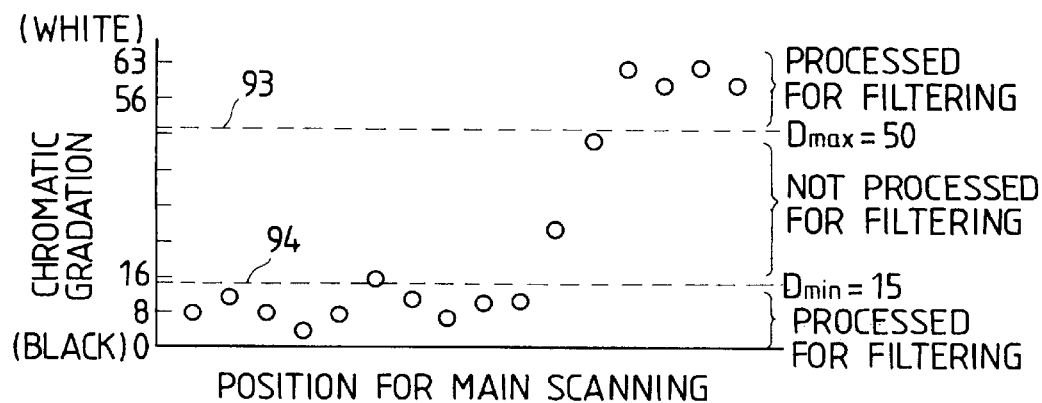
FIG. 19 is a chart illustrating the range in which the filtering process is performed for determining criterion value $d_3$.

FIG. 19 indicates an example of the range in which filtering is performed if determining criterion value $d_3$ is selected. As the result of the setting $D_{max}$ at 50 and $D_{min}$ at 15, as shown by the broken lines 93 and 94, filtering is performed by filtering block 42 only with respect to the individual chromatic grades outside that range.

Figure 20:
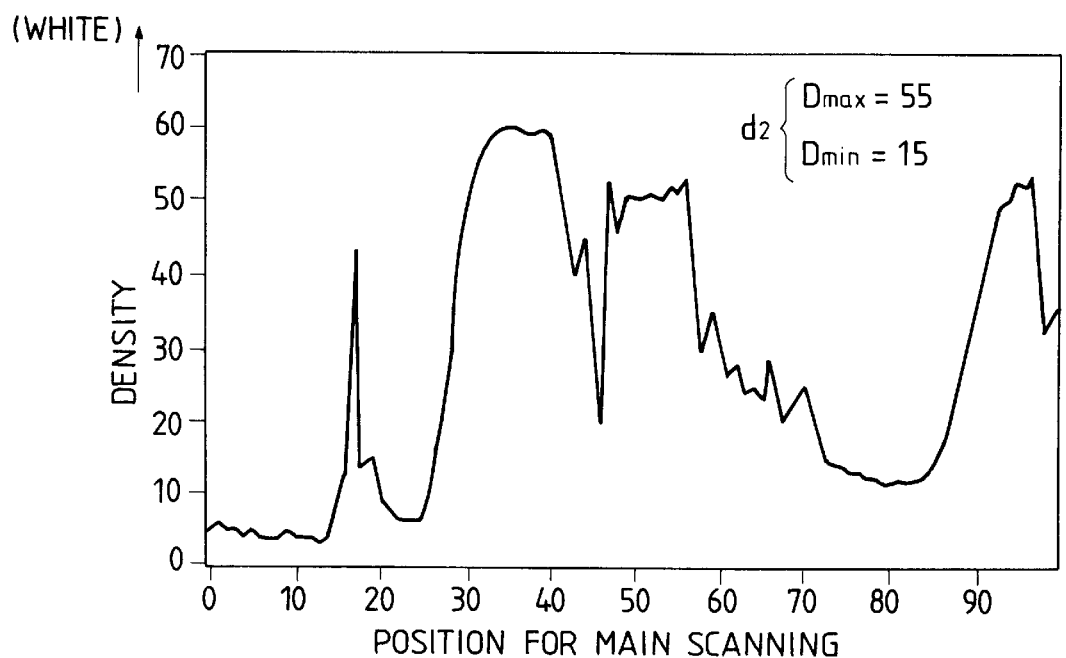
FIG. 20 is a chart illustrating the characteristics of the multiple value picture image data after filtering where the picture image data are filtered with determining criterion value $d_2$.
Figure 21:
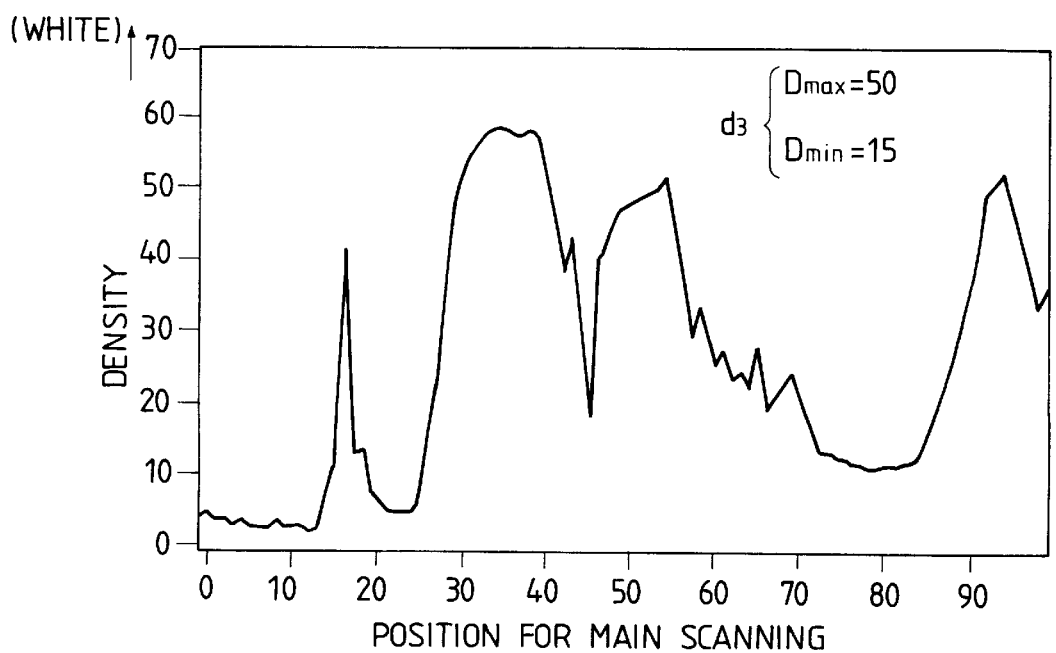
FIG. 21 is a chart illustrating the characteristics of the multiple value picture image data after filtering where the picture image data are filtered with determining criterion value $d_3$.

FIG. 20 and FIG. 21 illustrate the multiple value picture image data 87 obtained by processing the multiple value picture image data as the original picture images shown in FIG. 3(a) with determining criterion value $d_2$ and $d_3$, respectively. In these cases, the filtering characteristics of filtering block 42 are the same as those of the linear low pass filter 13 shown in FIG. 2.

The filtering process with the device in this third preferred embodiment is capable of achieving adequate filtering characteristics by changing the determining criterion value among those criterion values $d_1$, $d_2$, ... $d_n$, which are kept ready for application in the determining criterion selecting circuit 83, either by manual or automatic operation, in a manner suitable for the conditions of the original sheets.

Fourth Preferred Embodiment

FIG. 22 illustrates a fourth preferred embodiment of the multiple value image filtering device of the present invention as connected to a multiple value image input equipment. Those components of FIG. 22 which are the same as those in FIG. 4 or FIG. 17 have the same reference characters and a description of those components is omitted.

Comparator 102 in multiple value image filtering device 101 has two input terminals, $I_1$ at the comparing side and $I_2$ at the reference voltage side, in the same configuration as multiple value image filtering device 81 (FIG. 17) in the third preferred embodiment. Input terminal $I_1$ receives multiple value picture image data 22 from the multiple value image input equipment 21 in synchronism with a clock signal (not shown). Input terminal $I_2$ receives a dark area filtering process criterion signal 104 from a determining criterion selecting circuit 103. Dark area filtering process criterion signal 104 expresses the upper limit for performing a filtering process. In this fourth preferred embodiment, determining criterion selecting circuit 103 contains the determining criterion values $d_1$, $d_2$, ... $d_n$. The preferred determining criterion values, $d_1$, $d_2$, ... $d_n$ are shown as follows in Table 3:

TABLE 3

| Signal level | Value |
|---|---|
| $d_1$ | 16 |
| $d_2$ | 24 |
| $d_3$ | 32 |
| . | . |
| . | . |
| . | . |
| $d_n$ | 50 |

Comparator 102 compares the determining criterion value d for the input dark area filtering process criterion signal 104 with the signal level of the multiple value picture image data 22. When multiple value picture image data 22 are either equal to or larger than this criterion signal 104, comparator 102 outputs a first gate close signal 106 from first output terminal $O_1$. First gate close signal 106 is fed to the gate control terminal of first gate 37 to close first gate 37. In this situation, delayed output 44, unfiltered by filtering block 42, passes through second gate 39 and is output as multiple value picture image data 107 from multiple value image filtering device 101.

Comparator 102 outputs a second gate close signal 108 from second output terminal $O_2$ if the signal level of the multiple value picture image data 22 has a level other than what is used to generate signal 106. Second gate close signal 108 is fed to the gate control terminal of second gate 39, causing the filtered result 43 from filtering block 42 to pass through first gate 37 and be output as multiple value picture image data 107 from multiple value image filtering device 101.

Figure 23:
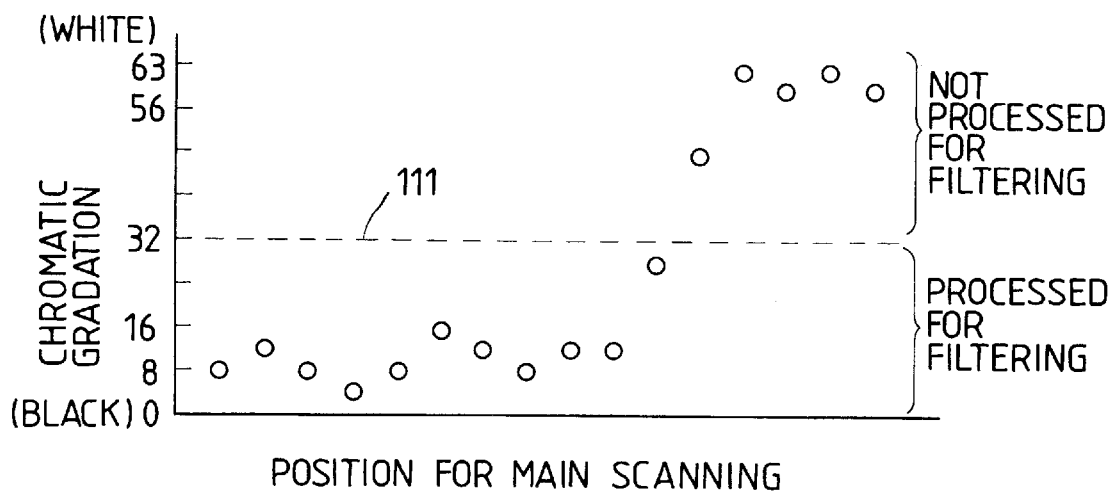
FIG. 23 is a chart illustrating the range in which the filtering process is performed for determining criterion value $d_3$.

FIG. 23 indicates an example of the range in which the filtering process is performed if the determining criterion value $d_3$ is selected. As the result of the signal level indicated by broken line 111 being set as the upper limit for the filtering, filtering is performed in a range below this upper limit, but is not in any range in excess of this upper limit.

Figure 24:
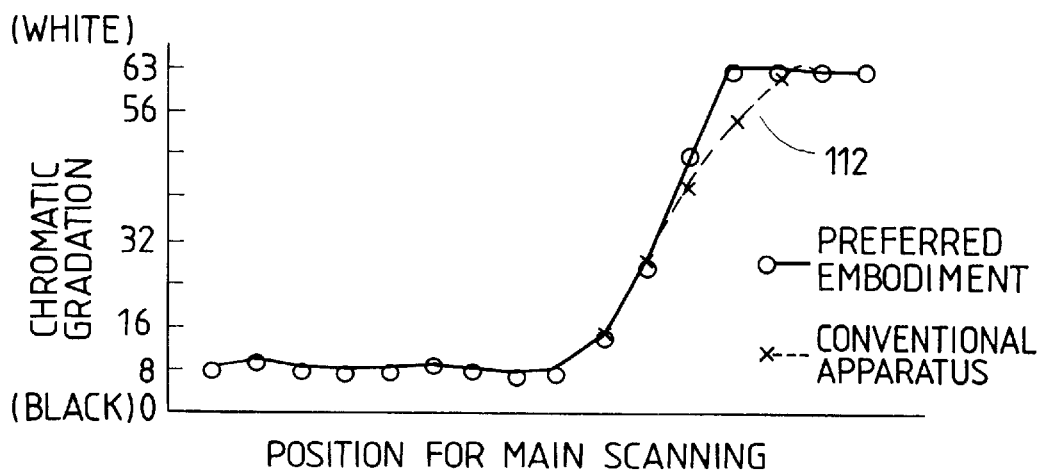
FIG. 24 is a chart showing the filtering characteristics of the fourth preferred embodiment of the present invention in comparison with such characteristics of the conventional multiple value image filtering device.

FIG. 24 shows a comparison of the filtering characteristics achieved by the device in the fourth preferred embodiment for determining criterion value $d_3$ with those achieved by conventional device. The sharpness of the picture images in the fourth preferred embodiment has been kept intact in white area 112 where the chromatic grade is high.

Figure 25:
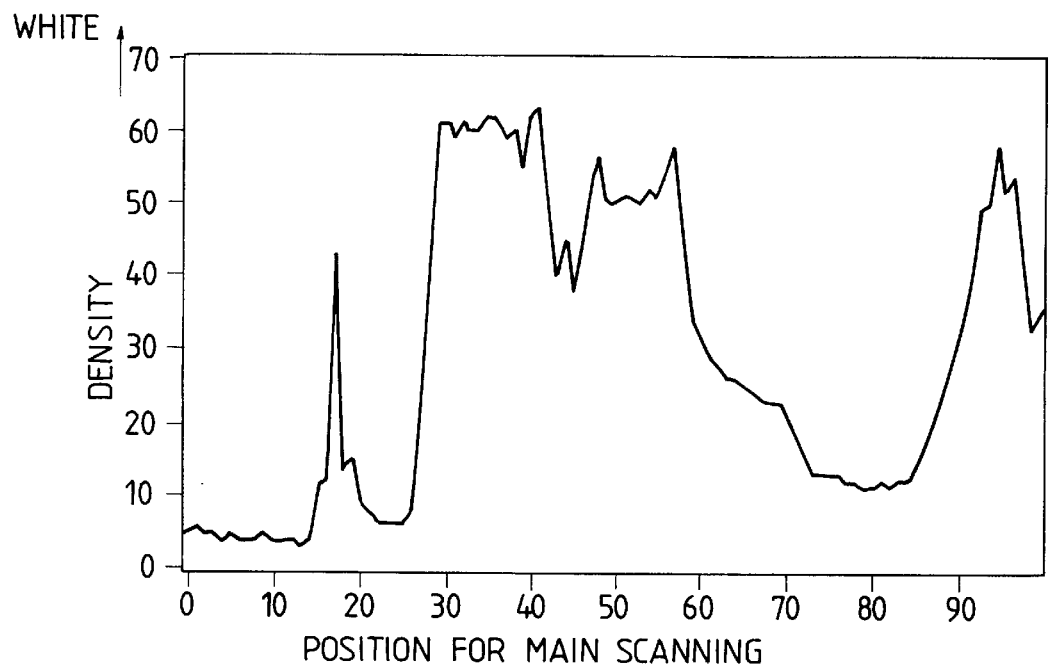
FIG. 25 is a chart illustrating the characteristics of the multiple value picture image data where the picture image data have been filtered with determining criterion value $d_2$.

FIG. 25 illustrates the multiple value picture image data 107 as a result of processing the multiple value picture image data shown in FIG. 3(a) for a determining criterion value $d_3$. In this case, the filtering characteristics of the filtering block 42 are the same as those of the linear low pass filter 13 shown in FIG. 2. The fourth preferred embodiment secures the sharpness of the picture images in the areas having a color that is white or close to white (i.e., where the chromatic grade is high) and effectively eliminates noise in areas where the color is black or close to black i.e., (where the chromatic grade is relatively low).

The filtering process with this fourth preferred embodiment is always capable of achieving adequate filtering characteristics by changing the determining criterion value among those criterion values $d_1, d_2, \ldots d_n$, which are kept ready for application in determining criterion selecting circuit 103, either by manual operation or by automatic operation, in a manner suitable for the condition of the original sheets.

Fifth Example of Preferred Embodiments

FIG. 26 illustrates a fifth preferred embodiment of a multiple value image filtering device according to the present invention as connected to a multiple value image input equipment. Those components in FIG. 26 which are the same as those in FIG. 4 or FIG. 22 are indicated with the same reference characters and descriptions of those components are omitted.

Comparator 122 in multiple value image filtering device 121 has two input terminals, input terminal $I_1$ at the comparing side and $I_2$ at the reference voltage side, in the same configuration as in the multiple value image filtering device 101 (FIG. 22) in the fourth preferred embodiment. Input terminal $I_1$ receives multiple value picture image data 22 from the multiple value image input equipment 21 in synchronism with a clock signal (not shown). Input terminal $I_2$ at the reference voltage side receives a bright area filtering process criterion signal 124 from a determining criterion selecting circuit 123. Bright area filtering process criterion signal 124 is the signal which expresses the criterion values for the lower limit of the filtering process. One of the determining criterion values $d_1, d_2, \ldots d_n$ is ready for application in the determining criterion selecting circuit 126. The preferred values for determining criterion values, $d_1, d_2 \ldots d_n$ are shown as follows in Table 4:

TABLE 4

| Signal level | Value |
|---|---|
| $d_1$ | 16 |
| $d_2$ | 24 |
| $d_3$ | 32 |
| . | . |
| . | . |
| . | . |
| $d_n$ | 50 |

Comparator 122 compares the determining criterion value d for the bright area filtering criterion signal 124 with the signal level of the multiple value picture image data 22, and when the signal level of multiple value picture image data 22 is less than this determining criterion value d, comparator 122 outputs the first gate close signal 126 from first output terminal $O_1$. The first gate close signal 126 is fed to the gate control terminal of the first gate 37 to close first gate 37. In this condition, delayed output 44, unfiltered by filtering block 42, passes through second gate 39 and is output as the multiple value picture image data 127 from the multiple value image filtering device 121. Comparator 122 outputs the second gate close signal 128 from second output terminal $O_2$ if the signal level of multiple value picture image data 22 is other than what generates signal 126. Second gate close signal 128 is fed to the gate control terminal of the second gate 39 so that filtered result 43, as processed by filtering block 42, passes through first gate 37 and is output as multiple value picture image data 127 from multiple value image filtering device 121.

Figure 27:
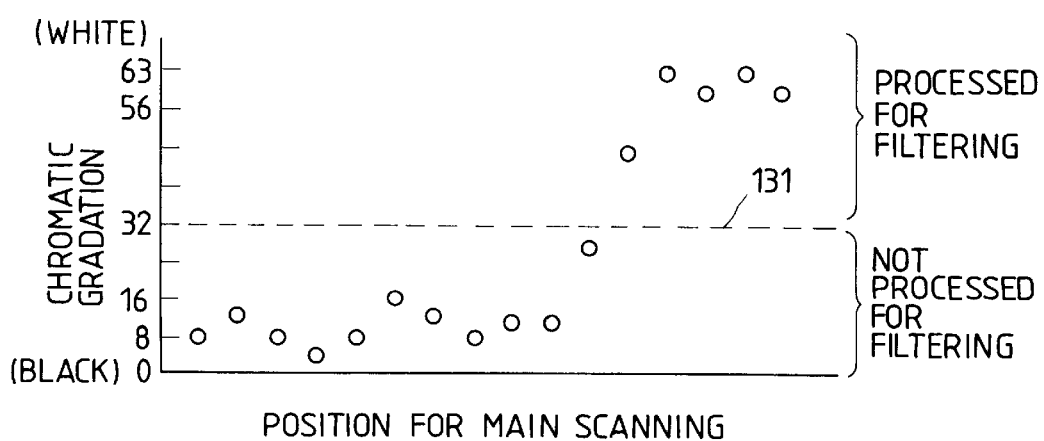
FIG. 27 is a chart illustrating the range in which the filtering process is performed for determining criterion value $d_3$.

FIG. 27 indicates the range in which the filtering process is performed for determining criterion value $d_3$. As the result of the signal level shown by the broken line 131 being selected as the lower limit criterion value for filtering, the filtering is performed in the range above this value but not below this value.

Figure 28:
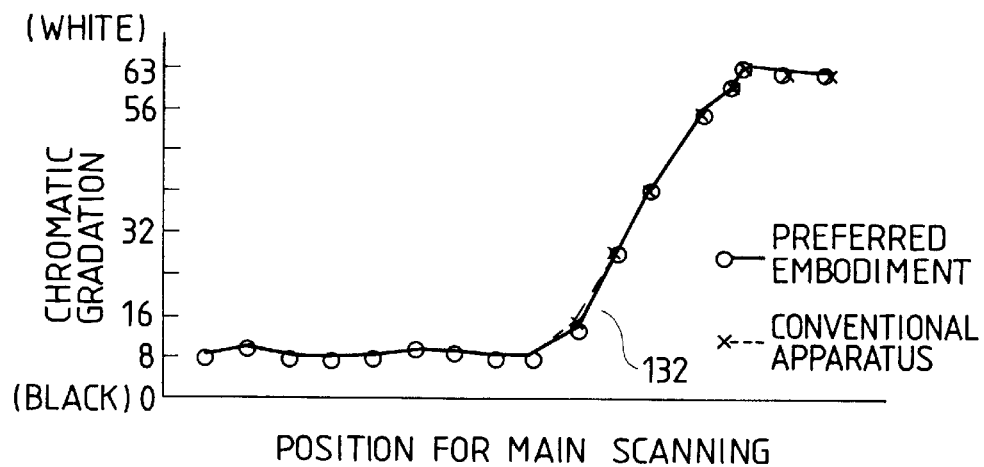
FIG. 28 is a chart showing the filtering characteristics of the fifth preferred embodiment of the present invention in comparison with such characteristics of the conventional multiple value image filtering device.

FIG. 28 indicates the filtering characteristics achieved by the multiple value image filtering device in this preferred embodiment for determining criterion value $d_3$ as compared with the filtering characteristics obtained by the conventional device. In this case, the sharpness of the picture images is kept intact in the area 132 close to the black color where the chromatic grade is low.

Figure 29:
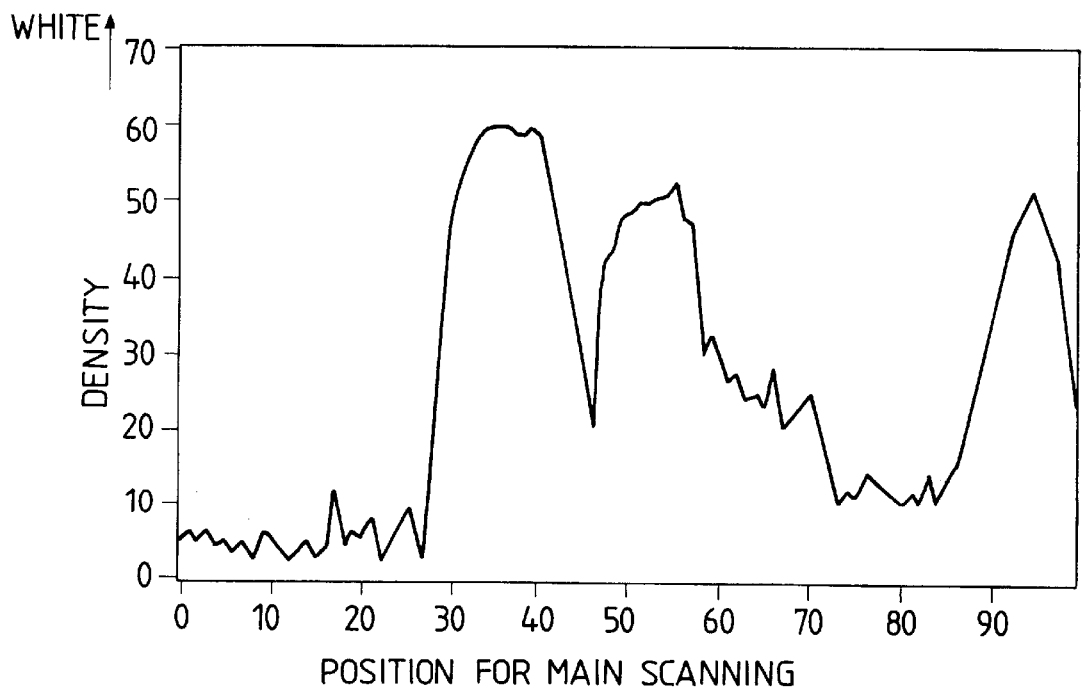
FIG. 29 is a chart illustrating the characteristics of the multiple value picture image data after filtering where the picture image data are filtered with determining criterion value $d_3$.

FIG. 29 illustrates the multiple value picture image data 127 as the result of processing the multiple value picture image data as the original picture images shown in FIG. 3(a) for determining criterion value $d_3$. In this case, the filtering characteristics of filtering block 42 are the same as those of the linear low pass filter 13 shown in FIG. 2. The device in the fourth preferred embodiment effectively eliminates the noise in the area close to white where the chromatic grade is relatively high, and secures the sharpness of the picture images in the area close to black, where the chromatic grade is low.

The filtering process with this fifth preferred embodiment is capable of always achieving adequate filtering characteristics by changing the determining criterion value among those criterion values $d_1, d_2, \ldots d_n$ which are kept ready for application in the determining criterion selecting circuit 126, either by manual or automatic operation, in a manner suitable for the condition of the original sheets.

As described above, the multiple value image filtering device according to the present invention is designed to distinguish the extent of the changes in density in multiple value picture image data in each case, to specify the range of noise in accordance with the range of changes in density, and to perform the filtering operations only with respect to the range thus specified. Therefore, the device according to the present invention can effectively eliminate noise without inadvertently making the picture images dull. Moreover, this multiple value image filtering device does not impair the sharpness of the picture images even if a process with various filtering characteristics is used, because the device can delimit the range to be subjected to the filtering process.

Furthermore, embodiments of the multiple value image filtering device of the present invention are capable of setting the range for filtering in accordance with the range of chromatic gradation of the multiple value picture image data, and therefore do not need to find the differences in density between adjacent pixels. These multiple value image filtering devices therefore expedite the processing of the picture images by eliminating the processing operations. Moreover, as this device is capable of specifying a density range for the filtering process and also changing the density range, this device can perform an adequate filtering process in a manner suitable for the conditions of the original sheet or other input.

The foregoing description of preferred embodiments of the invention have been presented for purposes of illustration and description. The description of possible embodiments is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A multiple value image filtering device for filtering noise from an image signal composed of sequential data segments, the device comprising:

characteristic extracting means for extracting from the data segments of the image signal a characteristic value used to determine selected data segments to be filtered;

comparing means, coupled to the characteristic extracting means, for comparing a prescribed determining criterion value with the characteristic values extracted from the image signal data segments to generate a filter signal when the characteristic value is within the range of prescribed determining criterion values, and to generate a nonfilter signal when the characteristic value exceeds the range of prescribed determining criterion values;

filter means for filtering the selected data segments of the image signal to form filtered data segments; and output signal forming means, responsive to the filter signal and the nonfilter signal and receiving as inputs the sequential data segments of the image signal and the filtered segments from the filter means, for constructing a multiple value image filtering device output signal as a sequence of output data segments corresponding to the image signal data segments, the output data segments being the corresponding image signal data segments when the nonfilter signal is generated for the corresponding segment, and being the filtered data segments when the filter signal is generated for the corresponding segment;

the characteristic extracting means including density difference calculating means for finding the difference between adjacent segments as the characteristic values.

2. In a multiple value image filtering device, a method of filtering noise from an image signal composed of sequential data segments, comprising the steps of:

extracting from the data segments of the image signal a characteristic value to determine select data segments to be filtered;

comparing a prescribed threshold value with the characteristic value extracted from the image signal data segments to generate a filter signal when the characteristic value is within the threshold value, and to generate a nonfilter signal when the characteristic value exceeds the threshold value;

filtering selected data segments of the image signal to form filtered data segments; and constructing a multiple value image filtering device output signal as a sequence of output data segments corresponding to the image signal data segments, the output data segments being the corresponding image signal data segments when the nonfilter signal is generated, and being the filtered data segments when the filter signal is generated, the extracting step including the substep of finding the difference between adjacent segments as the characteristic value.

* * * * *

UNITED STATES PATENT AND TRADEMARK OFFICE
CERTIFICATE OF CORRECTION

PATENT NO. : 5,987,185
DATED : November 16, 1999
INVENTOR(S) : Masato Suzuki

It is certified that error appears in the above-indentified patent and that said Letters Patent is hereby corrected as shown below:

Title page, item [54] and col. 1, line 1, "VALVE" should read --Value--.

Signed and Sealed this

Twentieth Day of March, 2001

Attest:

NICHOLAS P. GODICI

*Attesting Officer*      *Acting Director of the United States Patent and Trademark Office*